(12) United States Patent
Yaniv

(10) Patent No.: US 6,854,850 B2
(45) Date of Patent: Feb. 15, 2005

(54) MULTIPLE IMAGES FROM A SINGLE PROJECTOR

(75) Inventor: Zvi Yaniv, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 10/347,728

(22) Filed: Jan. 21, 2003

(65) Prior Publication Data

US 2003/0137641 A1 Jul. 24, 2003

Related U.S. Application Data

(60) Provisional application No. 60/351,295, filed on Jan. 23, 2002.

(51) Int. Cl.[7] .................. G03B 21/26; G03B 21/28; G03B 21/56; G03H 1/00; G02B 5/08
(52) U.S. Cl. .............. 353/94; 353/99; 359/1; 359/449; 359/857; 359/865; 359/869; 359/872
(58) Field of Search ............... 359/443, 449, 359/857, 865, 869, 872, 1, 10, 35, 28; 353/94, 99, 51, 34, 64, 73, 78, 30, 31, 29, 12, 122, 115, 117; 348/746, 750, 751, 753, 754, 793, 343, 742; 345/88, 87, 99

(56) References Cited

U.S. PATENT DOCUMENTS

| 4,655,539 | A | * | 4/1987 | Caulfield et al. | ............... | 359/9 |
| 5,788,352 | A | * | 8/1998 | Montroy et al. | ............... | 353/30 |
| 6,170,953 | B1 | * | 1/2001 | Lee et al. | ............... | 353/82 |
| 6,431,711 | B1 | * | 8/2002 | Pinhanez | ............... | 353/69 |

* cited by examiner

Primary Examiner—Judy Nguyen
Assistant Examiner—Rochelle Blackman
(74) Attorney, Agent, or Firm—Kelly K. Kordzik; Winstead Sechrest & Minick P.C.

(57) ABSTRACT

An image projection system capable of projecting images to multiple screens or viewing surfaces. The system uses a moveable mirror to direct the projected images to the screens. The moveable mirror may work in concert with one or more fixed mirrors to reflect the projected images to screens in a variety of configurations relative to the projector.

20 Claims, 3 Drawing Sheets

MULTIPLE IMAGES FROM A SINGLE PROJECTOR

CROSS-REFERENCE TO RELATED APPLICATION

This application claims the benefit of U.S. Provisional Application No. 60/351,295, filed Jan. 23, 2002.

The present invention is also related to U.S. patent application Ser. No. 09/876,400, which is a continuation-in-part of Ser. No. 09/519,537.

TECHNICAL FIELD

The invention is generally related to the field of image projection systems, and more particularly to image projectors capable of projecting images to multiple screens or viewing surfaces.

BACKGROUND INFORMATION

When projecting images into an audience space, it may be desired to project images onto more than one screen. This may be due to increasing the audience capacity of the image demonstration or to present more information than can be presented on only screen. Typically, multiple images are presented by utilizing as many projectors as the desired number of screens. However, multiple projectors are expensive and it can be difficult to coordinate the presentation between the multiple projectors.

Accordingly, there exists a need to provide a low-cost way to multiplex the images of a single projector; that is, using one projector to present images on multiple screens. In addition to being relatively inexpensive, the multiplexing means should also be sufficiently flexible to allow for different viewing configurations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
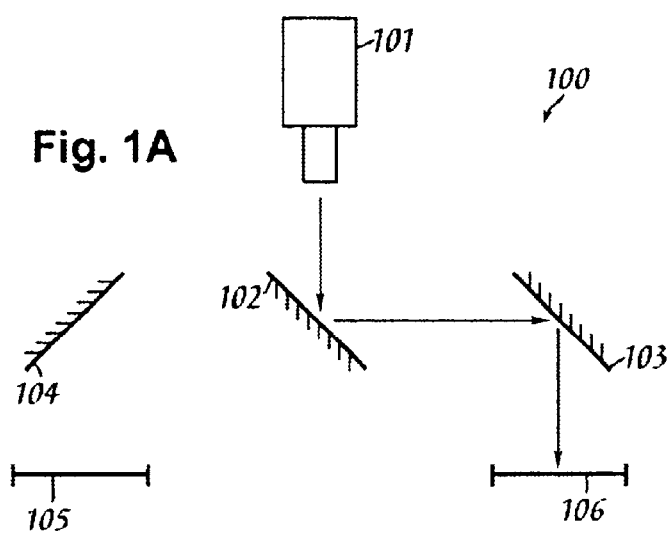
FIGS. 1A and 1B illustrate a top view of a multiple-image projection system in accordance with an embodiment of the present invention.

In the following description, numerous specific details are set forth such as specific screen materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

While the specification concludes with claims defining the features of the invention that are regarded as novel, it is believed that the invention would be better understood from a consideration of the following description in conjunction with the drawing figures, in which like reference numerals are carried forward.

Figure 1B:
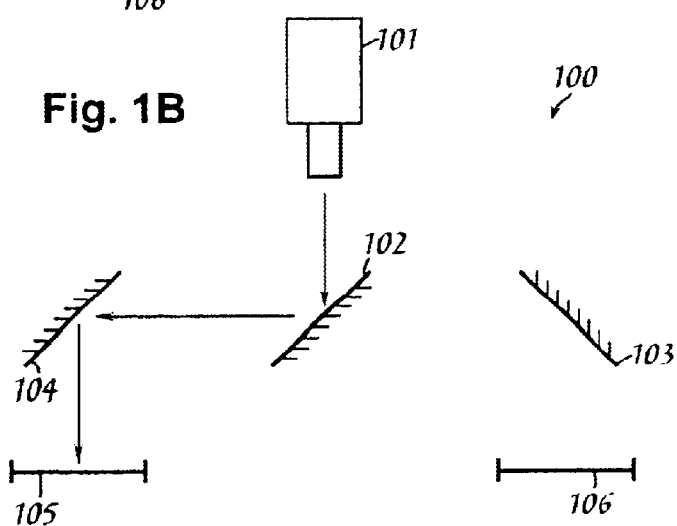

Referring to FIGS. 1A and 1B, a multiple-image projection system 100 embodying principles of the present invention is representatively illustrated. A single projector 101 projects an image at moveable mirror 102 along the path indicated by the arrows. Any well-known projector of images can be used. In the position shown in FIG. 1A, the moveable mirror 102 reflects the projected image toward fixed mirror 103 (as shown by the arrows), which is angled such that mirror 103 further reflects the image toward a display screen 106. FIG. 1B illustrates that moveable mirror 102 can be positioned to reflect the projected image to other fixed mirrors such as illustrated mirror 104, which further reflects the image toward other display screens such as illustrated screen 105.

Figure 4A:
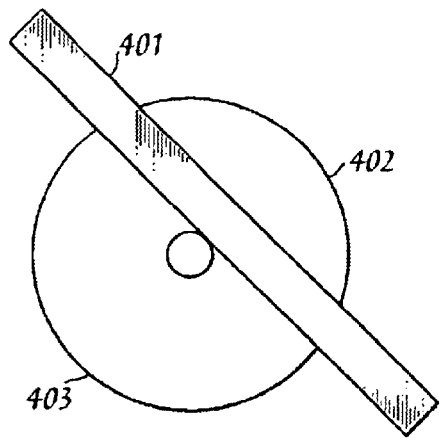
FIGS. 4A and 4B illustrate a top and side view, respectively, of a rotating mirror mount on a motor for use with the present invention; and, FIGS. 5A and 5B illustrate side views of an alternative rotating mirror mount on a motor for use with the present invention.
Figure 4B:
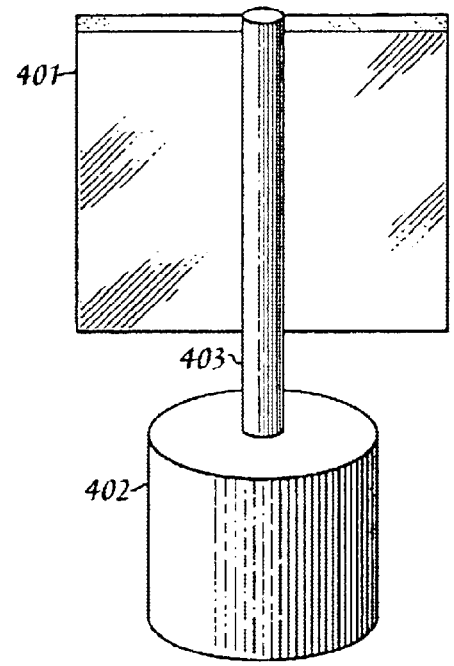
Figure 5A:
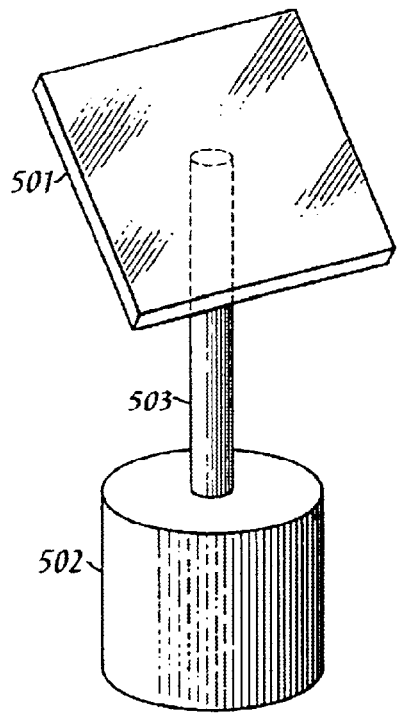
Figure 5B:
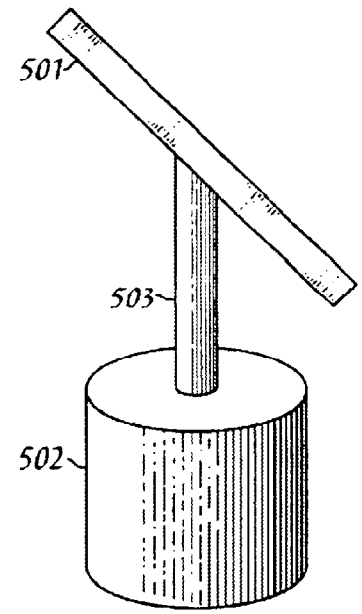

The means for moving the moveable mirror 102, which is not illustrated in FIGS. 1A and 1B, may be any well-known means for changing the position of a planar object, for example, a motor attached to the non-reflecting side of the mirror. FIGS. 4A, 4B, 5A, and 5B illustrate two possible mirror-motor configurations. In FIGS. 4A and 4B, a motor spindle 403 is connected along a portion of its length to a non-reflecting surface of a mirror 401. The motor 402 rotates the mirror along an axis that is parallel to the plane of the mirror 401. In FIGS. 5A and 5B, a motor spindle 503 is connected at its end to a non-reflecting surface of a mirror 501. The mirror is mounted at an angle desired to properly reflect a projected image. The motor 502 rotates the mirror to reflect the projected image where desired.

The means for moving the moveable mirror 102 could be controlled by any well-known means for controlling the means for moving, such as by an electronic signal provided by a wired, wireless, or networked system. Further, the moveable mirror may be continuously rotated to bring the projected image to each fixed mirror or moved in a flip-flop manner from mirror to mirror. In addition, a moveable mirror with more than one reflecting surface could be used to decrease the movement necessary to provide an image to a particular screen. An alternative embodiment includes continuously rotating the moveable mirror as stated above so that it repositions the projected light image onto each fixed mirror sequentially in a loop at a cycle frequency such that the image projected to the screen appears constant to a viewer of the image.

Figure 1C:
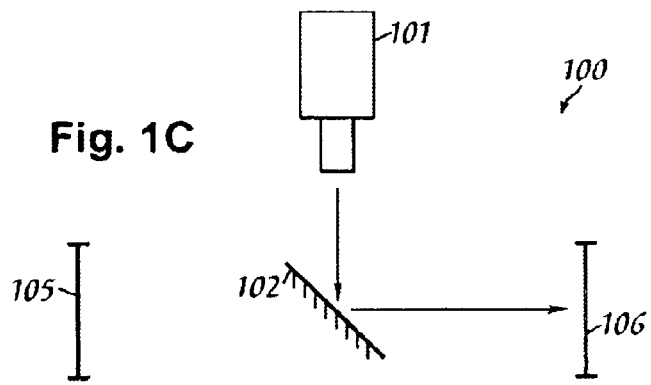
FIG. 1C illustrates a top view of an alternative embodiment of a multiple-image projection system.

It will be readily apparent to a person of ordinary skill that a multiple image projection system is not restricted to the illustration in FIGS. 1A and 1B. It is envisioned that a system including more than two screens, variable numbers of fixed mirrors, or more than one moveable mirror could be utilized. FIG. 1C illustrates an alternative multiple-image projection system that includes no fixed mirrors, instead reflecting the projected image directly to a screen 105 or 106 from the movable mirror 102.

Figure 2:
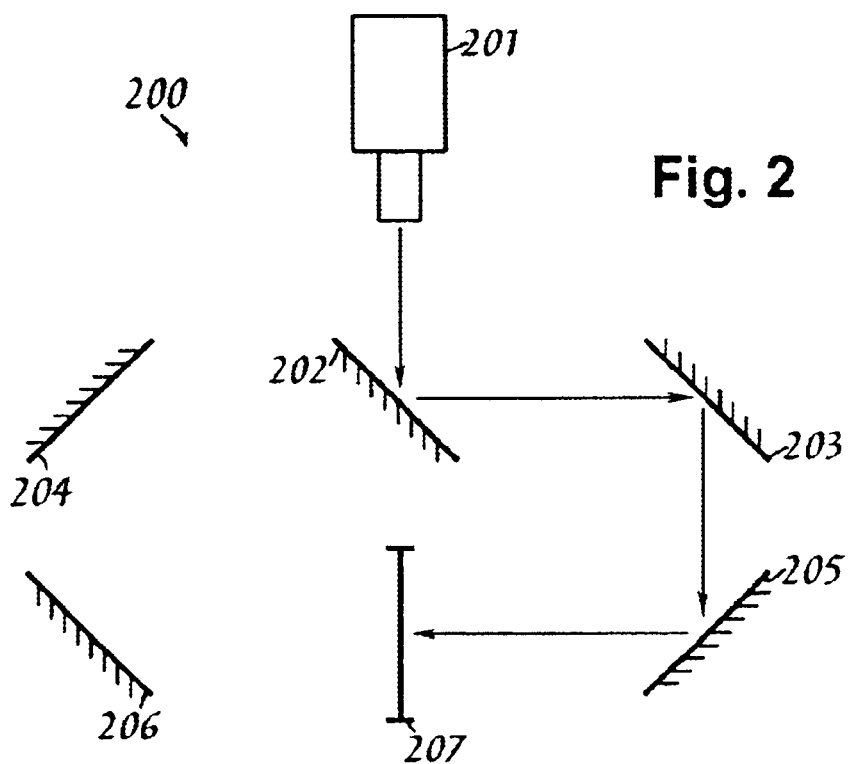
FIG. 2 illustrates a top view of an alternative embodiment of a multiple-image projection system showing projection of the images onto one of two sides of a screen.

Referring now to FIG. 2, an alternative multiple image projection system 200 is illustrated. As in FIGS. 1A and 1B, the light image from projector 201 is projected towards moveable mirror 202, which is positioned by a moving means similar to that described for FIGS. 1A and 1B. The projected image is then reflected from moveable mirror 202 toward one of a first set of fixed mirrors, either 203 or 204. The first set of fixed mirrors 203 and 204 are positioned so that they reflect the light image toward a second set of fixed mirrors 205 and 206 respectively. The second set of fixed mirrors further reflect the projected image to a side of screen 207 making it possible to view an image on either side of screen 207. Screen 207 may be opaque, translucent, or switchable as described in U.S. patent application Ser. No. 09/876,400, which is a continuation-in-part of Ser. No. 09/519,537, both of which are incorporated by reference herein. It will be readily appreciated that this system of projecting an image onto either side of a screen alleviates the problem of reversed images typically created when viewing an image through a translucent screen.

Figure 3:
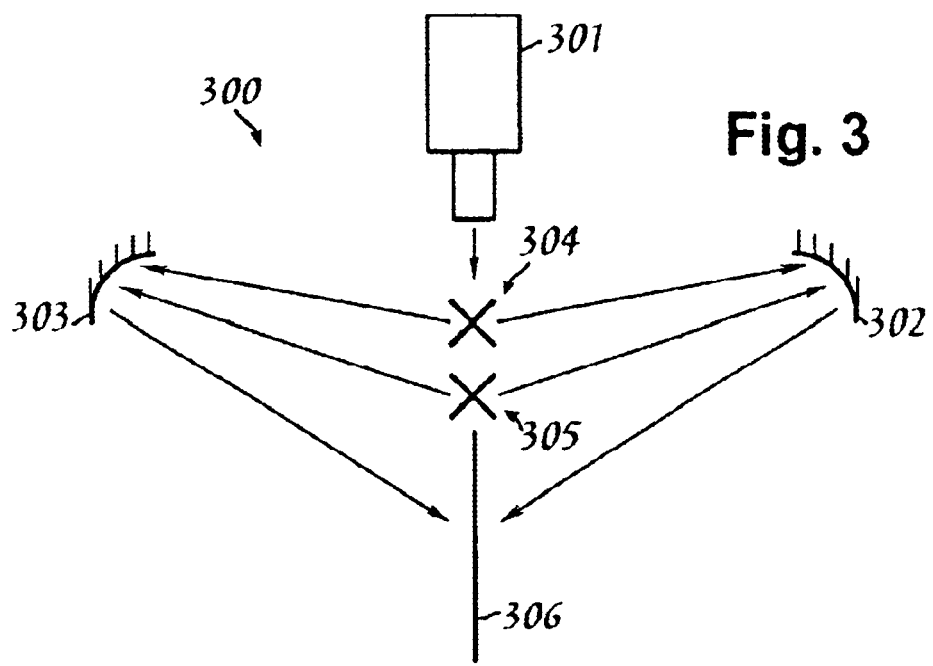
FIG. 3 illustrates a top view of an alternative embodiment of a multiple image projection system for projecting holographic images.

It should be understood that many types of mirrors may be used within the present invention, such as grating mirrors, metallic mirrors, and cold mirrors, and also the shape of the mirror may vary, i.e., parabolic or flat. The mirrors may also be made of many different types of materials. Referring to FIG. 3, fixed, parabolic, holographic mirrors 302 and 303 are utilized in projection system 300 to reflect images from moveable mirrors 304 and 305 from projector 301 to a holographic display medium 306. Holographic mirrors are designed utilizing holography by imprinting the material, such as plastic, with an interference pattern suitable for a specific optical function. A reflective substrate may then be designed to work in conjunction with the interference imprinted material by knowing the location of the source of light illuminating the interference pattern and using well-known holographic calculations. By using holography for the specific system shown one can achieve better efficiency, and if needed, even make the mirrors smaller in dimensions.

Although the present invention and its advantages have been described in detail, it should be understood that various changes, substitutions and alterations can be made herein without departing from the spirit and scope of the invention as defined by the appended claims.

What is claimed is:

1. A multiple-image projector system comprising:
an image projector for projecting an image retrieved from an image storage means containing images to be displayed on a plurality of screens;
a plurality of fixed mirrors;
a moveable mirror placed in the path of the projected image and positionable to reflect the projected image to a selected fixed mirror;
wherein each fixed mirror is positioned to reflect the projected image to one of the plurality of screens; and
wherein the moveable mirror moves continuously and wherein the moveable mirror has no more than one highly reflective surface.

2. The multiple-image projector system of claim 1 wherein said moveable mirror is positioned by a motor means.

3. The multiple-image projector system of claim 1 further comprising means for moving the moveable mirror to reposition the projected image sequentially onto each fixed mirror in a loop at a cycle frequency such that the image projected to the screen appears constant to a viewer of the image.

4. A multiple-image projector system comprising:
an image projector for projecting a light image;
a plurality of screens;
a plurality of fixed mirrors;
a moveable mirror placed in the path of the projected light image and positionable to reflect the projected light image to a selected fixed mirror;
wherein each fixed mirror is positioned to reflect the projected light image to
one of the plurality of screens; and
a means for moving the moveable mirror in a flip-flop manner to reposition the projected light image onto a selected fixed mirror.

5. The multiple-image projector system of claim 1 wherein one or more of the screens is opaque.

6. A multiple-image projector system comprising:
an image projector for projecting a light image;
a plurality of screens;
a plurality of fixed mirrors;
a moveable mirror placed in the path of the projected light image and positionable to reflect the projected light image to a selected fixed mirror;
wherein each fixed mirror is positioned to reflect the projected light image to one of the plurality of screens; and
wherein one or more of the screens is translucent.

7. A multiple-image projector system comprising:
an image projector for projecting a light image;
a plurality of screens; and
a moveable mirror placed in the path of the projected light image and positionable to reflect the projected light image to a selected one of the plurality of screens, wherein said moveable mirror is positioned by a motor means, wherein one or more of the screens is translucent.

8. A multiple-image projector system comprising:
an image projector for projecting a light image;
a screen with first and second projectable sides;
first and second fixed primary mirrors;
a moveable mirror placed in the path of the projected light image and positionable to reflect a projected light image to a selected fixed primary mirror wherein the moveable mirror moves continuously and the moveable mirror has no more than one highly reflective surface; and
a plurality of fixed secondary mirrors each positioned to receive the projected light image from a fixed primary mirror and to reflect the projected light image onto said screen.

9. The multiple-image projector system of claim 8 wherein said moveable mirror is positioned by a motor means.

10. The multiple-image projector system of claim 8 further comprising means for moving the moveable mirror to reposition the projected light image sequentially onto the first and second fixed primary mirrors in a loop at a cycle frequency such that the image projected to the screen appears constant to a viewer of the image.

11. The multiple-image projector system of claim 8 wherein the screen is opaque.

12. A multiple-image projector system comprising:
an image projector for projecting a light image;
a screen with first and second projectable sides;

first and second fixed primary mirrors;

a moveable mirror placed in the path of the projected light image and positionable to reflect a projected light image to a selected fixed primary mirror; and a plurality of fixed secondary mirrors each positioned to receive the projected light image from a fixed primary mirror and to reflect the projected light image onto said screen, wherein the screen is translucent.

13. A multiple-image projector system comprising:

an image projector for projecting a light image;

a screen with first and second projectable sides;

first and second fixed primary mirrors;

a moveable mirror placed in the path of the projected light image and positionable to reflect a projected light image to a selected fixed primary mirror; and a plurality of fixed secondary mirrors each positioned to receive the projected light image from a fixed primary mirror and to reflect the projected light image onto said screen, wherein the screen's ability to pass through light is variable.

14. A multiple-image projector system comprising:

an image projector for projecting a light image;

a screen with first and second projectable sides;

first and second fixed primary mirrors;

a moveable mirror placed in the path of the projected light image and positionable to reflect a projected light image to a selected fixed primary mirror;

a plurality of fixed secondary mirrors each positioned to receive the projected light image from a fixed primary mirror and to reflect the projected light image onto said screen; and means for moving the moveable mirror in a flip-flop manner to reposition the projected light image onto a selected fixed mirror.

15. A multiple-image projector system comprising:

an image projector for projecting a light image;

a plurality of fixed holographic mirrors;

a plurality of moveable mirrors placed in the path of the projected light image and positionable to reflect the projected light image to a selected fixed mirror; and wherein each fixed holographic mirror is positioned to reflect the light image to a holographic display medium.

16. The multiple-image projector system of claim 6 wherein one or more of the plurality of screens comprises particulate matter.

17. The multiple-image projector system of claim 8 wherein the moveable mirror is substantially flat.

18. The multiple-image projector system of claim 6 wherein one or more of the plurality of fixed mirrors has a concave-shaped mirrored surface.

19. The multiple-image projector system of claim 1 wherein a mirrored surface of the moveable mirror lies in a plane that is not parallel to an axis of rotation of the mirrored surface.

20. The multiple-image projector system of claim 7 wherein one or more of the plurality of screens comprises particulate matter.

* * * * *